(12) United States Patent
Ohishi et al.

(10) Patent No.: US 8,610,880 B2
(45) Date of Patent: Dec. 17, 2013

(54) DISTANCE MEASURING APPARATUS AND DISTANCE MEASURING METHOD

(75) Inventors: Masahiro Ohishi, Tokyo (JP);
Yoshikatsu Tokuda, Tokyo (JP)

(73) Assignee: Topcon Corporation, Tokyo (JP)

( * ) Notice: Subject to any disclaimer, the term of this patent is extended or adjusted under 35 U.S.C. 154(b) by 288 days.

(21) Appl. No.: 13/141,541

(22) PCT Filed: Dec. 18, 2009

(86) PCT No.: PCT/JP2009/071145
§ 371 (c)(1),
(2), (4) Date: Sep. 12, 2011

(87) PCT Pub. No.: WO2010/073994
PCT Pub. Date: Jul. 1, 2010

(65) Prior Publication Data
US 2011/0310377 A1 Dec. 22, 2011

(30) Foreign Application Priority Data
Dec. 25, 2008 (JP) ................................ 2008-330162

(51) Int. Cl.
*G01C 3/08* (2006.01)
(52) U.S. Cl.
USPC ........ 356/5.01; 356/3.01; 356/4.01; 356/497; 356/479; 356/493; 356/487; 315/82; 315/307; 315/224; 250/227.19; 250/227.27
(58) Field of Classification Search
USPC .............. 356/3.01, 4.01, 5.01, 497, 479, 493, 356/487; 315/82, 307, 224; 250/227.19, 250/227.27
See application file for complete search history.

(56) References Cited

U.S. PATENT DOCUMENTS 3,729,249 A * 4/1973 Habegger et al. ............... 359/10
4,521,107 A 6/1985 Chaborski et al.
(Continued)

FOREIGN PATENT DOCUMENTS

JP 57-147800 A 9/1982
JP 05-232231 A 9/1993
(Continued)

OTHER PUBLICATIONS

Japanese Office Action dated Jun. 4, 2013 in Application No. 2008-330162 and its English translation.
(Continued)

*Primary Examiner* — Isam Alsomiri
*Assistant Examiner* — Samantha K Abraham
(74) *Attorney, Agent, or Firm* — Foley & Lardner LLP

(57) ABSTRACT

A distance measuring apparatus and method that enable high-precision and high-speed measurement by canceling variations of a delay circuit in the apparatus are provided. Pulsed light is branched into first and second reference light, and transmitted measurement light, and the difference in detection time among the first reference light along a first path with no optical variations, the second reference light along a second path with an optical delay, and received measurement light from an object to be measured is measured. The received measurement light and the first reference light are temporally separate, distance is calculated from the difference in detection time between the received measurement light and the first reference light. When the received measurement light and the first reference light are not temporally separate, distance is calculated from a difference in detection time between the first reference light and the second reference light and a difference in detection time between the received measurement light and the second reference light.

20 Claims, 15 Drawing Sheets

(56) References Cited

U.S. PATENT DOCUMENTS

| | | | |
|---|---|---|---|
| 7,081,708 B2 * | 7/2006 | Ito et al. | 315/82 |
| 7,298,493 B2 * | 11/2007 | Ranalli | 356/493 |
| 7,982,881 B2 * | 7/2011 | Fercher et al. | 356/497 |
| 2007/0027391 A1 * | 2/2007 | Kohno | 600/427 |
| 2007/0076189 A1 | 4/2007 | Kumagai et al. | |

FOREIGN PATENT DOCUMENTS

| | | |
|---|---|---|
| JP | 08-226969 A | 9/1996 |
| JP | 2004-257961 A | 9/2004 |
| JP | 2007-093514 A | 4/2007 |
| JP | 2007-127541 A | 5/2007 |

OTHER PUBLICATIONS

I.H. Malitson; "Interspecimen Comparison of the Refractive Index of Fused Silica", Journal of the Optical Society of America, vol. 55, No. 10, pp. 1205 (Oct. 1965).

Gorachand Ghosh; "Temperature Dispersion of Refractive Indexes in Some Silicate Fiber Glasses", IEEE Photonics Technology Letters, vol. 6, No. 3, pp. 431 (Mar. 1994).

* cited by examiner

FIG.4A
$Tm \geq Tr_1 + Tp$ (LONG DISTANCE: CASE1)

CALIBRATION DATA ACQUISITION ROUTINE
[FIRST REFERENCE LIGHT PATH: PASSAGE ALLOWED  SECOND REFERENCE LIGHT PATH: PASSAGE ALLOWED
MEASUREMENT LIGHT PATH: PASSAGE BLOCKED]

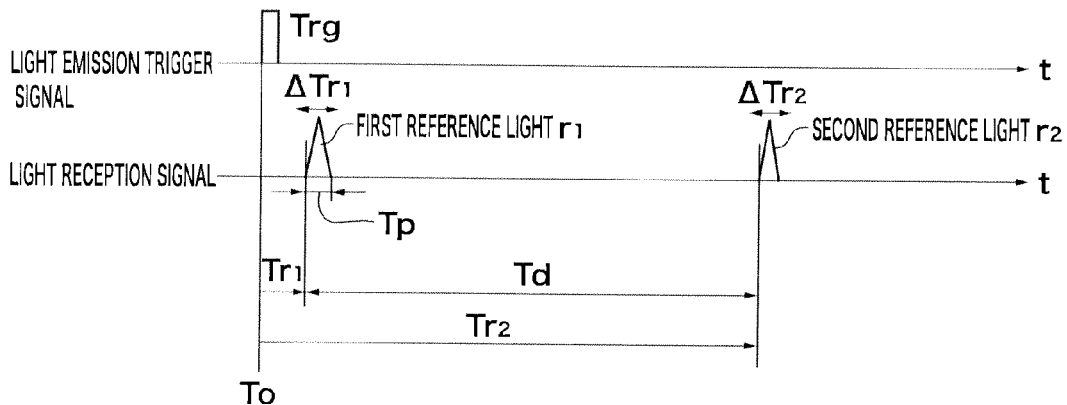

FIG.4B
TARGET APPROXIMATE POSITION DETECTION ROUTINE
[FIRST REFERENCE LIGHT PATH: PASSAGE BLOCKED  SECOND REFERENCE LIGHT PATH: PASSAGE BLOCKED
MEASUREMENT LIGHT PATH: PASSAGE ALLOWED]

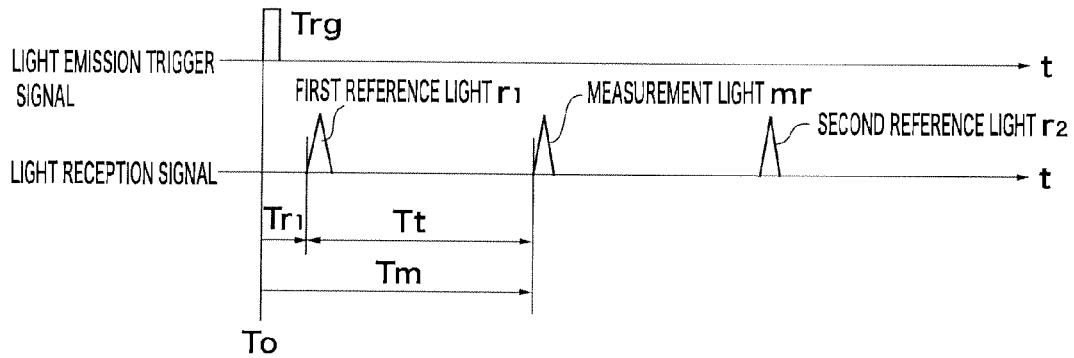

FIG.4C
DISTANCE MEASUREMENT ROUTINE
[FIRST REFERENCE LIGHT PATH: PASSAGE ALLOWED  SECOND REFERENCE LIGHT PATH: PASSAGE BLOCKED
MEASUREMENT LIGHT PATH: PASSAGE ALLOWED] (FIRST MEASUREMENT)

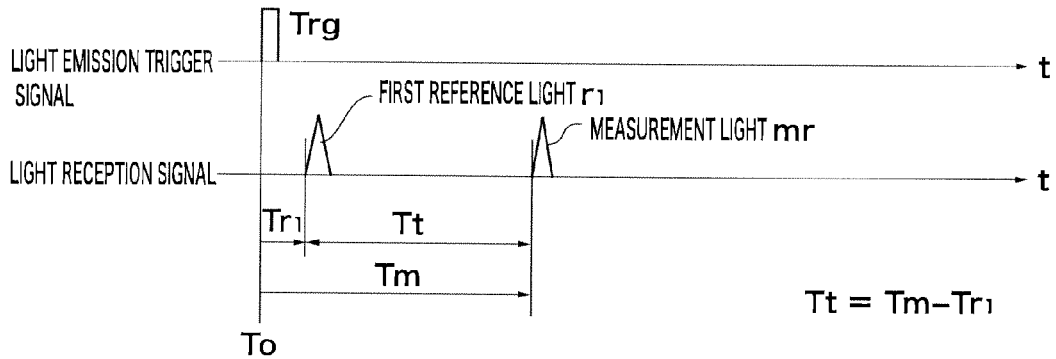

$Tt = Tm - Tr_1$

FIG.5A $Tm \leq Tr_1 + Tp$ (SHORT DISTANCE: CASE 2)

CALIBRATION DATA ACQUISITION ROUTINE
[FIRST REFERENCE LIGHT PATH: PASSAGE ALLOWED     SECOND REFERENCE LIGHT PATH: PASSAGE ALLOWED
MEASUREMENT LIGHT PATH: PASSAGE BLOCKED]

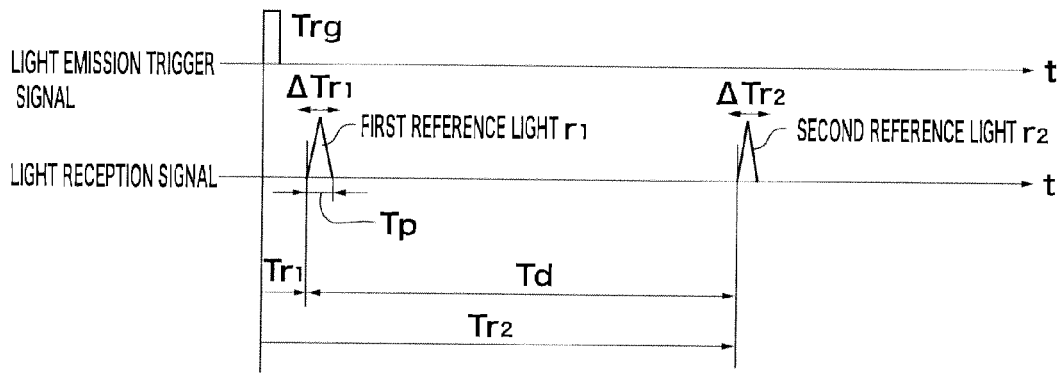

FIG.5B

TARGET APPROXIMATE POSITION DETECTION ROUTINE
[FIRST REFERENCE LIGHT PATH: PASSAGE BLOCKED     SECOND REFERENCE LIGHT PATH: PASSAGE BLOCKED
MEASUREMENT LIGHT PATH: PASSAGE ALLOWED]

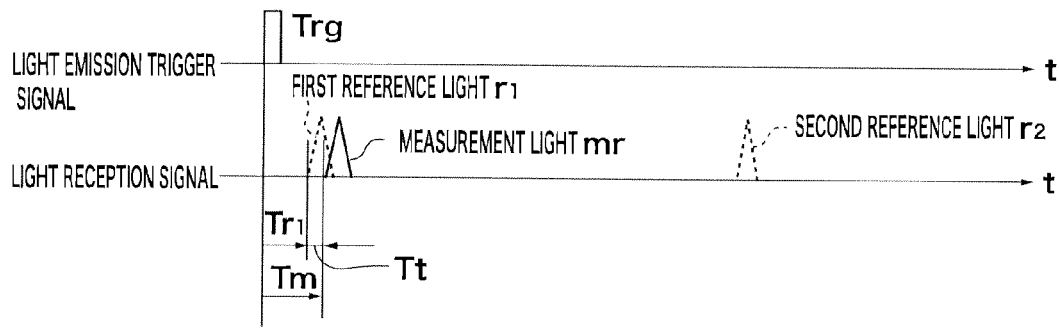

FIG.5C

DISTANCE MEASUREMENT ROUTINE
[FIRST REFERENCE LIGHT PATH: PASSAGE BLOCKED     SECOND REFERENCE LIGHT PATH: PASSAGE ALLOWED
MEASUREMENT LIGHT PATH: PASSAGE ALLOWED] (SECOND MEASUREMENT)

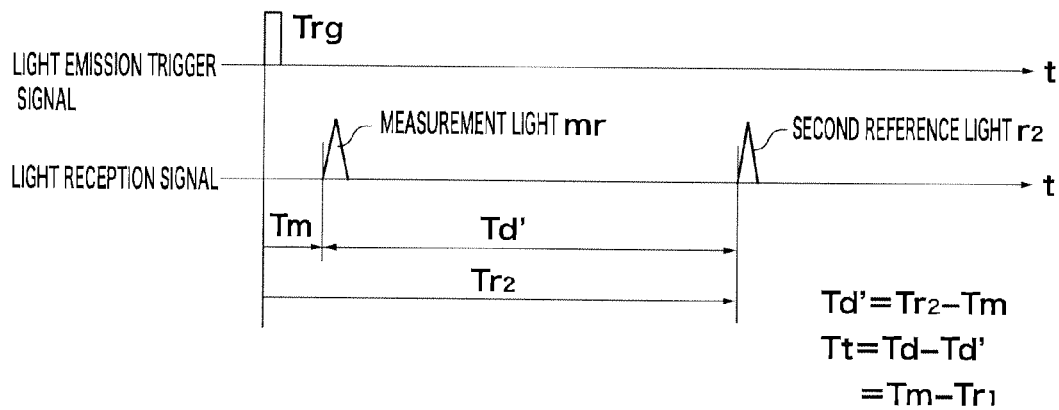

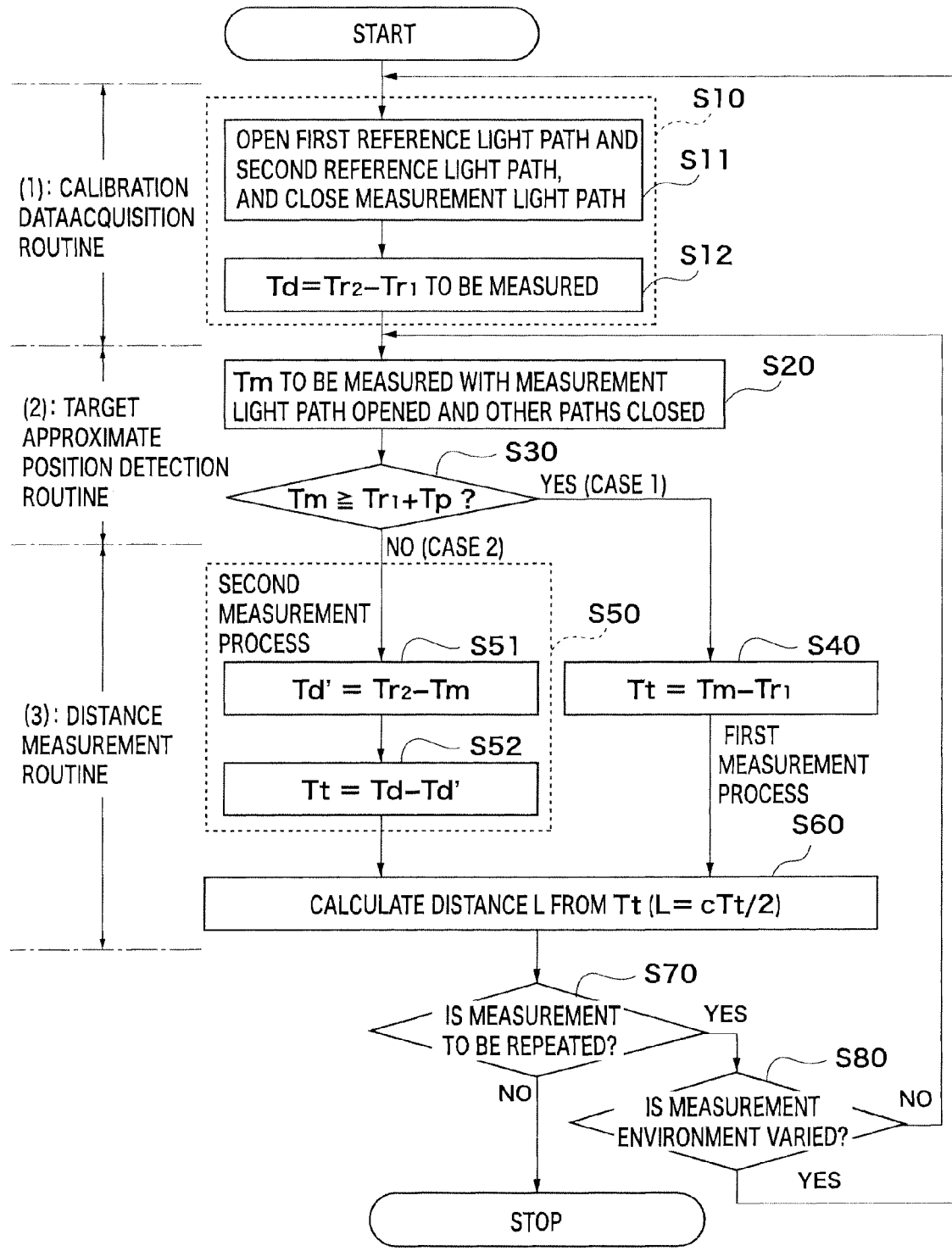

US 8,610,880 B2

DISTANCE MEASURING APPARATUS AND DISTANCE MEASURING METHOD

TECHNICAL FIELD

The present invention relates to a distance measuring apparatus and a distance measuring method in which the time from radiation of a light pulse to an object to be measured to return of reflected light is measured to measure the distance from the object to be measured. More specifically, the present invention relates to a distance measuring apparatus and a distance measuring method in which a distance measuring apparatus adopts a measurement scheme with a delay element included in a reference light path, the apparatus and the method enabling high-precision measurement by canceling the influence of temperature variations on delay time of the delay element or the like.

BACKGROUND ART

Hitherto, there has been a distance measuring apparatus that radiates pulsed light to an object to be measured and then detects the pulsed light reflected from the object to be measured to measure, using the road-trip propagation time of the pulsed light, the distance to the object to be measured.

Such a distance measuring apparatus adopts a scheme in which the propagation time is determined at a light processing stage so as not to be affected by electric variations in the distance measuring apparatus in order to perform measurement with as much accuracy as possible. For example, as shown in FIGS. 15A and 15B, a distance measuring apparatus 100 is provided with a pulsed light source 101, a reference light path Rc branched from the pulsed light source 101, and a photodetector 104, and adopts a scheme in which the photodetector 104 detects the propagation time lag of a measurement light path Mc leading to an object to be measured 160 with reference to the light pulse arrival time through the reference light path Rc to measure a distance L. Switching between the reference light path Rc and the measurement light path Mc is performed mechanically using light path switchers 103a and 103b, the propagation time of pulsed light by way of each of the light paths Rc and Mc is independently measured at temporally different timings, and the propagation time lag is calculated from the measurement results. However, it is difficult for this method to operate rapidly, which gives a significant factor that restricts shortening of the measurement time.

As one method of addressing this issue, a method in which switching between light (reference light rc) by way of the reference light path Rc and light (measurement light mc) by way of the measurement light path Mc is not performed and the reference light rc and the measurement light mc are synthesized to be detected with one photodetector is conceivable. In the case where the distance between the object to be measured 160 and the distance measuring apparatus 100 is short, however, the reference light rc and the measurement light mc may overlap each other on the time axis, which may make it difficult to accurately detect the time lag between the reference light rc and the measurement light mc (see case 1 in FIG. 15B). Thus, there is provided a method in which an optical delay generator, the delay time of which is accurately known in advance, is inserted in the reference light path Rc or the measurement light path Mc to separate the measurement light mc and the reference light rc from each other on the time axis and measure the time lag between the measurement light mc and the reference light rc, and thereafter the measured time lag is corrected with the value of the delay time of the optical delay generator (see case 2 in FIG. 15B; Patent Document 1, for example).

When the pulsed light source 101 is driven, electro-magnetically induced noise is produced on the electric output side of the photodetector 104 because of significant current variations at the moment of light emission. If the time of passage through the reference light path Rc is short, the induced noise may overlap the reference light rc on the time axis to cause a measurement error. In order to avoid such a phenomenon, a delay element with a certain delay time may be added to the reference light path Rc to separate the reference light rc and the measurement light mc from each other (Patent Document 2, for example).

Normally, the pulsed light source 101 produces a pulse having a pulse width of about 10 n seconds in many cases. In order to generate a delay of 10 n seconds, it is necessary that the delay element should have a length of at least 2 meters (in the case where an optical fiber with a refractive index of 1.5 is used). In practice, the delay time is set in consideration of a margin, and thus it is desirable to set a delay time of several times or more of the pulse width. In order to obtain a delay time of 100 n seconds, which is one order higher, the delay element, if formed by an optical fiber, should have a length of about 20 meters. Further, in the case where a high-precision time lag measurement method through detection of a zero point of a damped oscillation waveform to be discussed later is adopted, a noise level of about −58 dB (1/800) or less is desirable. In such a case, the delay element should have a long length of 200 meters or more in terms of optical distance.

As the delay element described above, an optical fiber that can be bent freely and that can achieve a longer delay time with smaller geometry is suitable. However, the propagation delay time of the optical fiber is varied depending on the temperature. The temperature coefficient of the refractive index of a quartz fiber is about 10 ppm/° C. (Non-Patent Document 1 and Non-Patent Document 2, for example), and in the case where the length of the fiber is 130 meters, which achieves a delay time equivalent to that achieved by the length of 200 meters described above, and the variation in outside temperature is 50° C., the error in measurement distance due to variations in delay time is about 10 cm. Such an error is not allowable for a precise distance measuring apparatus that aims at a measurement accuracy of about 1 mm.

PRIOR ART DOCUMENT

Patent Document
   Patent Document 1: JP-557-147800
   Patent Document 2: JP-H5-232231
Non-Patent Document
   Non-patent Document 1: I. H. Malitson; "Interspecimen Comparison of the Refractive Index of Fused Silica", Journal of the Optical Society of America, vol.55, no.10, pp.1205 (October 1965)
   Non-patent Document 2: Gorachaud Ghosh; "TemperatureDispersion of Refractive Indexes in some Silicate Fiber Glasses", IEEEPHOTONICS TECHNOGY LETTERS, vol.6, no.3, pp.431(March 1994)

SUMMARY OF INVENTION

Problems to be Solved by the Invention

In order to address the foregoing issue, it is an object of the present invention is to provide a distance measuring apparatus and a distance measuring method that enable high-precision and high-speed measurement by canceling the influence of variations of a delay circuit in a distance measuring apparatus.

Means for Solving the Problem

To solve the above problem, a distance measuring apparatus 1 according to Aspect 1 of the invention comprises, as shown in FIG. 1 for example, a light source section 10 that emits light in a pulsed manner in synchronization with a trigger signal Trg, a light splitting section 30 that branches the light from the light source section 10 into first reference light r1, second reference light r2, and transmitted measurement light mt, a first reference light path R1 that transmits the first reference light r1 and that causes no variations in optical distance, a second reference light path R2 that includes an optical delay generating section 50 which generates a temporal delay with respect to the first reference light path R1 and that transmits the second reference light r2, a reference light path switching section 60 that has a function of allowing transmission through either one of the first reference light path R1 or the second reference light path R2 and blocking transmission through the other one of the first reference light path R1 or the second reference light path R2, allowing transmission through both the first and second reference light paths (R1, R2), and blocking transmission through both the first and second reference light paths (R1, R2), a transmitting section 110t that radiates the transmitted measurement light mt to an object 160 to be measured, a receiving section 110r that receives the radiated light mt reflected by the object 160 to be measured as received measurement light mr, a measurement light amount adjusting section 90 (91 (See FIG. 2), 92) that blocks the transmitted measurement light mt or the received measurement light mr, a light synthesizing section 70 that synthesizes output light from the first reference light path R1, output light from the second reference light path R2, and the received measurement light mr received by the receiving section 110r, a photo-electric converting section 140 that converts a light signal synthesized by the light synthesizing section 70 into an electric signal, and a measurement control section 150 having a function of controlling the reference light path switching section 60 and the measurement light amount adjusting section 90 to determine a distance on the basis of a time at which a signal obtained through the photo-electric converting section 140 is detected.

The phrase "emit light in a pulsed manner in synchronization with a trigger signal Trg" means that the timing of light emission is determined on the basis of the timing of the trigger signal Trg. In other words, there need only be a certain relationship between the timing of the trigger signal Trg and the timing of the light emission. The phrase "emit light in a pulsed manner" may mean emitting a single pulse or emitting repeated pulses, but not emitting continuous light. The phrase "emit light" refers to producing light which may be either visible light or invisible light. The term "light source" may mean any sources of coherent light such as a laser beam or non-coherent light such as light emitted from an LED or the like. The phrase "first reference light path that causes no variations in optical distance" means that variations in passage time caused in the first reference light path due to envisioned variations in measurement environment such as temperature are small enough to be ignored compared to the measurement accuracy of the distance measuring apparatus. The phrase may be replaced with "practically have no influence" or "generally have no influence on the accuracy." For example, in the case where a measurement accuracy of about 1 mm is required, variations of about 0.1 mm, which is 1/10 of the measurement accuracy, may be allowed against variations in measurement environment. The term "allow transmission" refers to transmitting all or part of incident light energy. The term "block transmission" refers to transmitting none of incident light energy. The term "transmitting section" refers to a section that emits the transmitted measurement light mt in the form of a beam from the distance measuring apparatus 1 to the object to be measured 160, and the term "receiving section" refers to a section that guides to the photo-electric converting section 140 the received measurement light mr reflected by the object to be measured 160 and returning to the distance measuring apparatus 1. The transmitting section and the receiving section may be formed with some components shared between each other. For example, in FIG. 1, the lens 113 is a part of the transmitting section 110t, and also a part of the receiving section 110r.

Thus, as the transmission of the first and second reference lights, the transmitted measurement light, and the received measurement light can be independently controlled between a blocked state and a transmission allowed state, it is possible to provide a high-utility measurement platform allowing implementation of second and subsequent aspects of the present invention discussed next. In addition, when measurement is performed with only the first and second reference lights, the measurement can be performed in a collimated state for the object to be measured, which allows measurement under conditions close to measurement of the received measurement light for distance calculation. That is, it is not necessary to cancel the collimated state not to receive the received measurement light in order to measure only the first and second reference lights.

To solve the above problem, the distance measuring apparatus 1 according to Aspect 2, in the distance measuring apparatus according to Aspect 1, as shown in FIG. 1 FIG. 4 and FIG. 5 for example, the measurement control section has (1) a function of controlling the reference light path switching section 60 so as to allow transmission through the first reference light path R1 and the second reference light path R2, controlling the measurement light amount adjusting section 90 (91 (See FIG. 2), 92) so as to block one of the transmitted measurement light mt or the received measurement light mr, and measuring a time lag (Tr1) between the trigger signal Trg and the first reference light r1 and a time lag (Tr2) between the trigger signal Trg and the second reference light r2 using an output of the photo-electric converting section 140 to store the measurement results;

(2) a function of blocking both transmissions through the first reference light path R1 and the second reference light path R2 and allowing both transmissions of the transmitted measurement light mt and the received measurement light mr to measure a time lag (Tm) between the received measurement light mr and the trigger signal Trg;

(3) a first measurement function of allowing transmission through the first reference light path R1, blocking transmission through the second reference light path R2, and allowing both transmissions of the transmitted measurement light mt and the received measurement light mr, to determine a measurement light path difference (Tt) in accordance with a value of a time lag (Tm−Tr1) between the received measurement light mr and the first reference light r1;

(4) a second measurement function of blocking transmission through the first reference light path R1, allowing transmission through the second reference light path R2, and allowing both transmissions of the transmitted measurement light mt and the received measurement light mr, to calculate a time lag (Td'=Tr2−Tm) between the second reference light r2 and the received measurement light mr, and further calculating a time lag (Td=Tr2−Tr1) from values of the time lag (Tr2) and the time lag (Tr1) calculated in the function (1) to determine the measurement light path difference (Tt) by calculating (Td−Td');

(5) a function of selectively using the first measurement function and the second measurement function on the basis of the time lag (Tm) obtained by the function (2); and (6) a function of determining a distance to the object 160 to be measured, in accordance with a value of the measurement light path difference (Tt).

With such a configuration, measurement can be performed with high accuracy over a wide distance range from a short distance to a long distance. That is, in the case where the received measurement light and the reference light can be separated from each other on the time axis as in a long-distance measurement, measurement is performed without inserting delay means, which enables accurate measurement through a simple process. Meanwhile, in the case where the received measurement light and the reference light are not sufficiently separated from each other on the time axis and a high accuracy may not be achieved as in a short-distance measurement, delay means is inserted to separate the received measurement light and the reference light from each other. In addition, variations in delay time due to temperature variations of the delay means or the like can be canceled. Thus, measurement can be performed with high accuracy.

To solve the above problem, the distance measuring apparatus 1 according to Aspect 3, in the distance measuring apparatus according to Aspect 2, as shown in FIG. 1, FIG. 4 and FIG. 5 for example, the measurement light amount adjusting section 90 further has a function of attenuating the received measurement light mr or the transmitted measurement light mt, and a function of roughly matching a level of the received measurement light mr with levels of the first reference light r1 and the second reference light r2.

Here, the measurement light amount adjusting section 90 may adjust the level of the transmitted measurement light mt, the level of the received measurement light mr, or both of them. As shown in the FIG. 1, the inserted measurement light amount adjusting section 90 is not limited to the measurement light amount adjusting section 92 provided on the reception side, and, as shown in FIG. 2, may be the measurement light amount adjusting section 91 provided on the transmission side. That is, the measurement light amount adjusting section 90 may be inserted to a different portion of the distance measuring apparatus as long as the level of the received measurement light mr can be controlled. The phrase "roughly matching a level" means preventing a measurement error due to the difference among the levels of respective pulses of the received measurement light mr, the first reference light r1, and the second reference light r2 to match the levels to such a degree that allows accurate measurement of the temporal positions.

With such a configuration, it is possible to measure the temporal interval between the reference light r1 or r2 having propagated through the reference light path and the received light mr.

To solve the above problem, the distance measuring apparatus 1 according to Aspect 4, in the distance measuring apparatus according to Aspect 1 or Aspect 2, a time of the delay generated by the optical delay generating section 50 is set such that a difference between a time of passage through the first reference light path R1 and a time of passage through the second reference light path R2 is twice or more a pulse width Tp of the transmitted measurement light mt produced by the light source section 10. The term "pulsed light" includes not only a single light pulse but also a burst signal formed by a plurality of pulses (pulse width: Ts) as shown in FIGS. 11 and 14, for example. At this time, the pulse width Tp corresponds to the burst length.

With such a configuration, the first reference light r1 and the second reference light r2 can be temporally separated from each other even if both the first reference light r1 and the second reference light r2 are input to the single photo-electric converting section 140 without switching between the first reference light path R1 and the second reference light path R2. Therefore, it is possible to measure the time lag between Tr1 and Tr2 with high measurement accuracy.

To solve the above problem, the distance measuring apparatus 1 according to Aspect 5, in the distance measuring apparatus according to any one of Aspect 2 to Aspect 4, as shown in FIG. 4 (2) and FIG. 5 (2) for example, the measurement control section compares the time lag between the first reference light r1 and the received measurement light mr with the pulse width Tp of the pulsed light to determine whether the time lag (Tr1) and the time lag (Tm) are separate from each other. Here, the term "pulsed light" includes not only a single light pulse but also a burst signal formed by a plurality of pulses (pulse width: Ts) as shown in FIG. 11 and FIG. 14, for example. At this time, the pulse width Tp corresponds to the burst length.

With such a configuration, it is possible for the reference light path switching section 60 to perform switching appropriately, which secures a high measurement accuracy, even if the pulse width Tp of the measurement light mt is varied because of variations in characteristics of the light source section 10.

To solve the above problem, the distance measuring apparatus 1 according to Aspect 6, in the distance measuring apparatus according to any one of Aspect 1 to Aspect 5, as shown in FIG. 1 for example, the optical delay generating section 50 is an optical fiber.

With the use of the optical fiber, the overall size of the distance measuring apparatus can be reduced by rolling the optical fiber into a small roll to provide the optical delay generating section which is small but which provides a significant delay time.

To solve the above problem, the distance measuring apparatus 1 according to Aspect 7, in the distance measuring apparatus according to any one of Aspect 2 to Aspect 6, as shown in FIG. 7 and FIG. 8 for example, the photo-electric converting section 140 has a resonance circuit section 170 that converts the received pulsed light signal into a damped oscillation waveform, and determines the time lag on the basis of a zero cross point t1, t2, . . . or tn of the damped oscillation waveform.

The position of a zero cross point of a damped oscillation waveform on the time axis does not vary significantly on the time axis of a light signal even if the amplitude of the received light signal fluctuates. Thus, there is little influence of various types of disturbance. In addition, because a zero point at which there is little influence of variations in offset voltage produced in an electric process or the like is used as the reference, a high accuracy can be obtained. It is desirable to determine the time lag on the basis of a zero cross point t1 which is first after the start of oscillation, because the position of the zero cross point t1 is especially stable on the time axis compared to the other zero cross points t2, . . . , and tn.

To solve the above problem, a distance measuring method for measuring a distance according to Aspect 8, as shown in FIG. 1, FIG. 4, FIG. 5 and FIG. 6 for example, is using a distance measuring apparatus having, a light source section 10 that emits light in a pulsed manner in synchronization with a trigger signal Trg, a light splitting section 30 that branches the light from the light source section 10 into first reference light r1, second reference light r2, and transmitted measurement light mt, a first reference light path R1 that transmits the first reference light r1 and that causes no variations in optical distance, a second reference light path R2 that includes an optical delay generating section 50 which generates a temporal delay with respect to the first reference light path R1 and that transmits the second reference light r2, a reference light path switching section 60 that has a function of allowing transmission through either one of the first reference light path R1 or the second reference light path R2 and blocking transmission through the other one of the first reference light path R1 or the second reference light path R2, allowing transmission through both the first and second reference light paths (R1, R2), and blocking transmission through both the first and second reference light paths (R1, R2), a transmitting section 110t that radiates the transmitted measurement light mt to an object 160 to be measured, a receiving section 110r that receives the radiated light mt reflected by the object 160 to be measured as received measurement light mr, a measurement light amount adjusting section 90 (91 (See FIG. 2), 92) that blocks the transmitted measurement light mt or the received measurement light mr, a light synthesizing section 70 that synthesizes output light from the first reference light path R1, output light from the second reference light path R2, and the received measurement light mr received by the receiving section 110r, and a photo-electric converting section 140 that converts a light signal synthesized by the light synthesizing section 70 into an electric signal.

The distance measuring method comprises:

(1) a step (S10) of controlling the reference light path switching section 60 so as to allow transmission through the first reference light path R1 and the second reference light path R2, controlling the measurement light amount adjusting section 90 so as to block one of the transmitted measurement light mt or the received measurement light mr, and measuring a time lag (Tr1) between the trigger signal Trg and the first reference light r1 and a time lag (Tr2) between the trigger signal Trg and the second reference light r2 using an output of the photo-electric converting section 140 to store the measurement results, (2) a step (S20) of blocking both transmissions through the first reference light path R1 and the second reference light path R2 and allowing both transmissions of the transmitted measurement light mt and the received measurement light mr to measure a time lag (Tm) between the received measurement light mr and the trigger signal Trg, (3) a first measurement step (S40) of allowing transmission through the first reference light path R1, blocking transmission through the second reference light path R2, and allowing both transmissions of the transmitted measurement light mt and the received measurement light mr, to determine a measurement light path difference (Tt) in accordance with a value of a time lag (Tm−Tr1) between the received measurement light mr and the first reference light r1, (4) a second measurement step (S50) of blocking transmission through the first reference light path R1, allowing transmission through the second reference light path R2, and allowing both transmissions of the transmitted measurement light mt and the received measurement light mr, to calculate a time lag (Td'=Tr2−Tm) between the second reference light r2 and the received measurement light mr, and further calculating a time lag (Td=Tr2−Tr1) from values of the time lag (Tr2) and the time lag (Tr1) calculated in the step (1) to determine the measurement light path difference (Tt) by calculating (Td−Td'), (5) a step (S30) of selectively using the first measurement step (S40) and the second measurement step (S50) on the basis of the time lag (Tm) obtained by the step (2), and (6) a step (S60) of determining a distance to the object 160 to be measured, in accordance with a value of the measurement light path difference (Tt).

With such a configuration, measurement can be performed with high accuracy over a wide distance range from a short distance to a long distance. That is, in the case where the received measurement light and the reference light can be separated from each other on the time axis as in a long-distance measurement, measurement is performed without inserting delay means, which enables accurate measurement through a simple process. Meanwhile, in the case where the received measurement light and the reference light are not sufficiently separated from each other on the time axis and a high accuracy may not be achieved as in a short-distance measurement, delay means is inserted to separate the received measurement light and the reference light from each other. In addition, variations in delay time due to temperature variations of the delay means or the like can be canceled. Thus, measurement can be performed with high accuracy.

BRIEF DESCRIPTION OF DRAWINGS

FIGS. 4A, 4B and 4C show various waveforms obtained through measurement (long distance: case 1) according to an embodiment of the present invention.

FIGS. 5A, 5B and 5C show various waveforms obtained through measurement (short distance: case 2) according to an embodiment of the present invention.

FIG. 6 shows measurement procedures according to an embodiment of the present invention.

DESCRIPTION OF EMBODIMENTS

Figure 1:
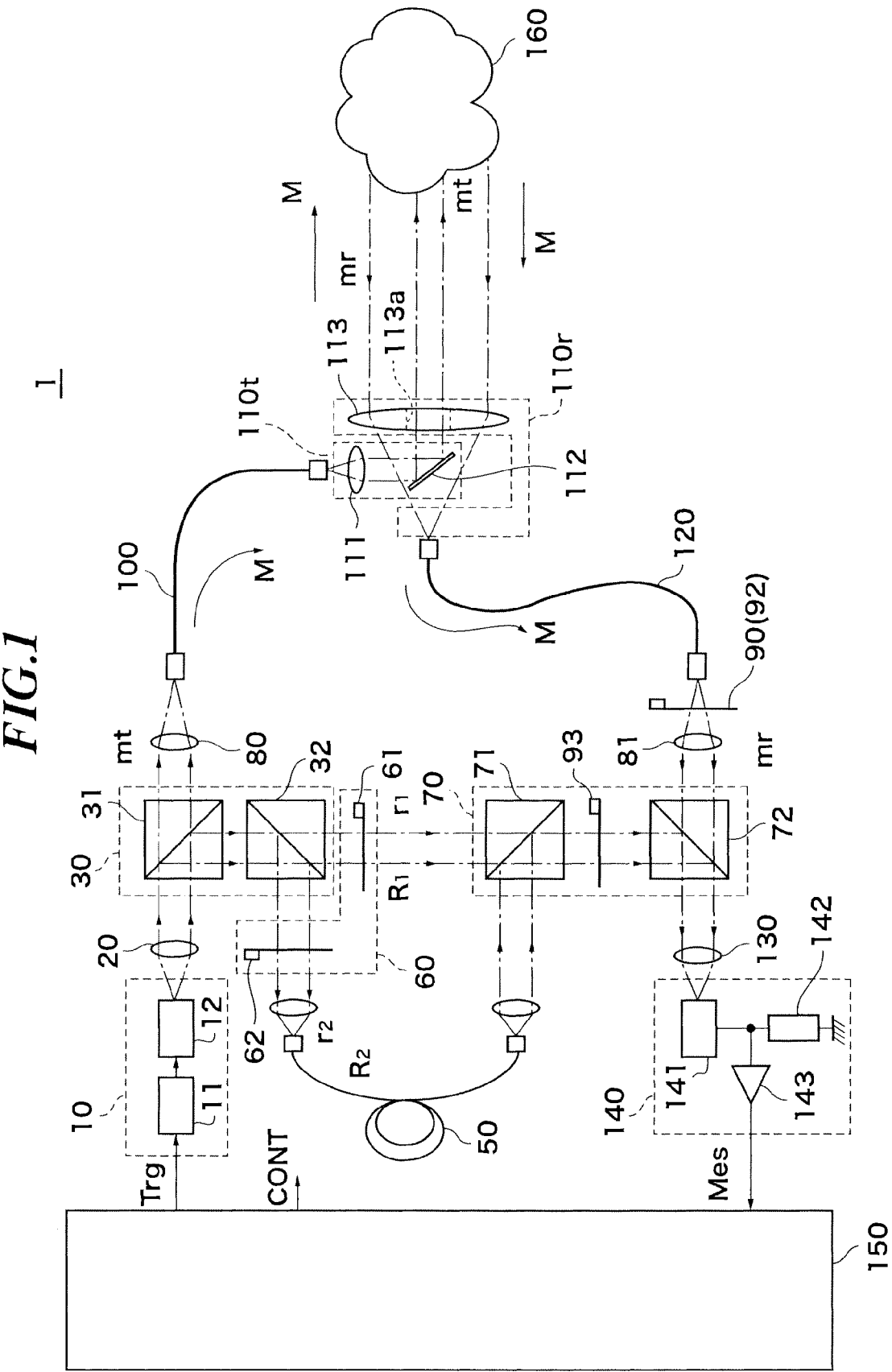
FIG. 1 shows the overall configuration of a distance measuring apparatus according to a first embodiment of the present invention.

The basic Japanese Patent Application No. 2008-330162 filed on Dec. 25, 2008 is hereby incorporated in its entirety by reference into the present application.

The present invention will become more fully understood from the detailed description given hereinbelow. The other applicable fields will become apparent with reference to the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiments. Among the disclosed changes and modifications, those which may not literally fall within the scope of the present claims constitute, therefore, a part of the present invention in the sense of doctrine of equivalents.

Embodiments of the present invention will be described below with reference to the drawings. In the drawings, the same or corresponding components are denoted by the same reference numerals to avoid redundant description.

[Exemplary Configuration of Distance Measuring Apparatus]

With reference to FIG. 1, a distance measuring apparatus 1 according to a first embodiment of the present invention will be described. A light source section 10 produces light pulse light (transmitted measurement light mt) at a constant timing on the basis of a trigger signal Trg. The light source section 10 is formed by a light emitting element 12 and a light emission drive circuit 11 that drives the light emitting element 12. The light emitting element 12 is typically a semiconductor laser that can radiate a thin light beam to even an object to be measured 160 at a long distance, but may be a non-coherent light source, such as an LED, if the distance to an object to be measured 160 at a short distance is to be measured. In the embodiment, a semiconductor laser, in particular a pulsed laser diode, is used. The light emission drive circuit 11 applies a drive current to the light emitting element 12, and applies a current at a threshold or more for a period for which light emission is desired. That is, the light emission drive circuit 11 applies a drive current all at a moment (at a stretch) when light emission is desired. While the light emission drive circuit 11 generates a light emitting element drive pulse with a required pulse width on the basis of the trigger signal, the drive pulse may be a single pulse, or may be pulses repeated in predetermined cycles on the basis of the trigger signal Trg. The light pulse produced by the light emitting element 12 is converted into a parallel beam by a collimating lens 20.

The light pulse converted into a parallel beam by the collimating lens 20 is divided into transmitted measurement light mt, first reference light r1, and second reference light r2 by a light splitting section 30. The light splitting section 30 is formed with two beam splitters 31 and 32, for example. That is, the parallel beam from the collimating lens 20 is split by the beam splitter 31 into two beams, one of which is defined as the transmitted measurement light mt and the other of which is further divided by the beam splitter 32 into two beams, which are defined as the first reference light r1 and the second reference light r2. The transmitted measurement light mt output from the beam splitter 31 is condensed by a condenser lens 80, and input to an optical fiber 100 for connection to a transmitting section 110t.

In the transmitting section 110t, the transmitted measurement light mt having propagated in the optical fiber 100 is converted by a collimating lens 111 again into a parallel beam, which is bent by a light projecting mirror 112 into an orthogonal direction. The bent beam passes through a hole 113a formed around the center of an objective lens 113 to be radiated toward the object to be measured 160.

The light reflected by the object to be measured 160 is condensed by the objective lens 113 provided in a receiving section 110r to be input to an optical fiber 120 for connection.

The light having propagated in the optical fiber 120 is converted by a collimating lens 81 into a parallel beam.

Figure 3:
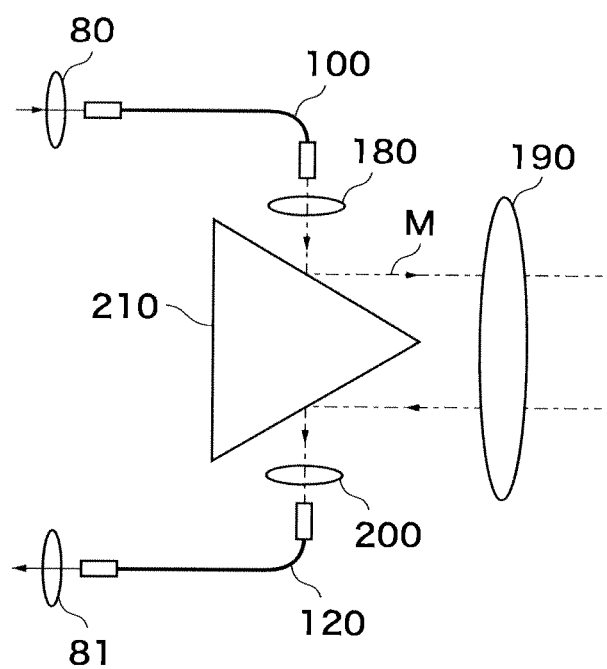
FIG. 3 shows the configuration of a transmitting section and a receiving section which use a prism.

FIG. 3 shows the transmitting section 110t and the receiving section 110r according to another embodiment. As shown in the drawing, the embodiment is formed by inserting a prism 210 between a lens 180 and a lens 190 and between a lens 200 and the lens 190.

Returning to FIG. 1, a measurement light amount adjusting section 90 (91, 92) is provided between the condenser lens 80 and the optical fiber 100 (on the transmission side), or between the collimating lens 81 and the optical fiber 120 (on the reception side). The measurement light amount adjusting section may be inserted either on the transmission side or on the reception side, preferably on the reception side. This is because varying the light amount on the transmission side varies the amount of internal reflection noise due to reflection by a surface of an optical component in the apparatus or the like, which makes it difficult to obtain a stable distance measurement accuracy, but providing the measurement light amount adjusting section on the reception side makes the amount of internal reflection noise constant, which makes it possible to obtain a stable distant measurement accuracy. The measurement light amount adjusting section 90 applies desired attenuating to incident light, and is controlled by a measurement control section 150. The amount of attenuating can be infinitely increased, and if the measurement light amount adjusting section is configured to completely block the incident light, the measurement light amount adjusting section can be used also as measurement light blocking means to be described later. Alternatively, the measurement light amount adjusting section 90 (91, 92) may be disposed at a position other than that shown in FIG. 1, such as between the condenser lens 80 and the light splitting section 30 or between the collimating lens 81 and a light synthesizing section 70.

The first reference light r1 and the second reference light r2 split by the beam splitter 32 are selected as reference light by a reference light path switching section 60. For example, as shown in FIG. 1, the first reference light r1 and the second reference light r2 are input to a first reference light path switcher 61 and a second reference light path switcher 62, respectively. The first reference light path switcher 61 and the second reference light path switcher 62 are controlled by the measurement control section 150, and configured to either allow or block transmission of the incident light.

The light having passed through the first reference light path switcher 61 is input to the light synthesizing section 70 by way of a first reference light path R1. The first reference light path R1 is typically a simple space with a short light path length. That is, the first reference light path switcher 61 and the light synthesizing section 70 are optically directly coupled to each other, which causes substantially no variations in optical distance. For the first reference light path R1, an optical fiber that is so short as to cause practically no variations in distance may be used. The length of the optical fiber may be about several tens of centimeters for an accuracy of 1 millimeter, for example.

The light having passed through the second reference light path switcher 62 is input to the light synthesizing section 70 by way of a second reference light path R2. An optical delay generating section 50 is inserted in the second reference light path R2. The optical delay generating section 50 causes a difference in propagation time between the first reference light path R1 and the second reference light path R2, and is typically formed by an optical fiber. More specifically, the optical delay generating section 50 may be formed by a graded-index optical fiber.

The respective lights having propagated through the first reference light path R1 and the second reference light path R2 are synthesized by a beam splitter 71 in the light synthesizing section 70, and the synthesized signal is adjusted in level by a reference light amount adjusting section 93, and thereafter further synthesized with received measurement light mr by a beam splitter 72.

The light signal synthesized by the beam splitter 72 is condensed by a condenser lens 130 to be incident into a light receiving element 141 provided in a photo-electric converting section 140. The light receiving element 141 is typically formed by an APD (avalanche photodiode), but maybe any other element that has a required sensitivity to sufficiently respond to the light pulse output from the light source section 10. A detection output of the light receiving element 141 appears as an electric signal across a load 142, and is amplified by a preamplifier 143 to be output as a measurement output Mes.

With reference to the measurement procedures of FIG. 6 and as appropriate to FIGS. 4 and 5, an operation of the distance measuring apparatus 1 will be described. As shown in FIG. 6, the procedures include (1) a calibration data acquisition routine, (2) a target (object to be measured) approximate position detection routine, and (3) a distance measurement routine. The distance measurement routine is further divided into a first measurement and a second measurement in accordance with the distance to the object to be measured. As shown in FIG. 6, first, in step S10, a difference Td between the time of passage of light through the first reference light path R1 and the time of passage of light through the second reference light path R2 is calculated, and the calculated value is stored. Step S10 includes step S11 and step S12. In step S11, the measurement control section 150 commands the first reference light path switcher 61 to allow transmission, the second reference light path switcher 62 to allow transmission, and the measurement light amount adjusting section 90 to block transmission. Next, in step S12, the time lag (difference) Td between the first reference light r1 and the second reference light r2 is measured. In this way, light from the light source section 10 is propagated through the first reference light path R1 and the second reference light path R2 to be incident into the photo-electric converting section 140, but the transmitted measurement light mt is not propagated. This state is shown in FIG. 4A and FIG. 5A. While Tr1 and Tr2 are measured with reference to a timing T0 of the trigger signal Trg in FIGS. 4 and 5, the embodiment is not limited thereto, and it is only necessary that a constant temporal interval from the transmitted measurement light mt be kept. However, use of the timing T0 of the trigger signal Trg as a reference enables processing as an electric signal, provides less unstable elements, and allows high-precision measurement. In the following description, T0 is used as a reference.

The waveforms of the first reference light r1 and the second reference light r2 output from the photo-electric converting section 140 are shown in FIG. 4A and FIG. 5A. The first reference light r1 and the second reference light r2 received by the light receiving element 141 have been delayed by Tr1 and Tr2, respectively, from the reference timing T0. The pulse width (burst width in the case where the light source section outputs a burst signal formed by a plurality of pulses as discussed later) of each reference light is Tp. In step S12 of FIG. 6, the timing at which the light source section 10 outputs the first reference light r1 and the second reference light r2 is measured such that the first reference light r1 and the second reference light r2 are received at a constant timing with reference to the time at which the trigger signal Trg is input. While the timing at which the transmitted measurement light mt is produced is synchronized with the timing T0 at which the trigger signal Trg is input, there may in general be a certain time delay. Even in such a case, the time interval between the timing at which an output of the light source section 10 rises and the timing T0 at which the trigger signal Trg is input is kept constant. Thus, the propagation time difference Td between the first reference light r1 and the second reference light r2 can be determined with reference to the timing T0 (hereinafter referred to as "reference timing T0") at which the trigger signal Trg is input. That is, $$Td = Tr2 - Tr1 \quad (1)$$

The value of Td and Tr are stored in a memory of the control section 150.

The value of Tr2 varies in accordance with temperature variations of the optical fiber, which serves as the optical delay generating section 50, inserted in the second reference light path R2, or the like. The variation amount is defined as ΔTr2. On the other hand, the first reference light path R1 does not include a significant delay element, and thus ΔTr1 can be substantially ignored. While ΔTr2 is a factor that may cause a measurement error, such an error can be canceled in accordance with the embodiment of the present invention, which is its feature. This will be described in detail later.

Next, the measurement light amount adjusting section 90 is caused to allow transmission to propagate measurement light through a measurement light path M, and the first reference light path R1 and the second reference light path R2 are caused to block transmission, so that the photo-electric converting section 140 observes the received measurement light mr to measure a reception timing Tm (step S20). The value of Tm, Tr1 stored in S10, and the pulse width Tp are used to determine whether Tm<Tr1+Tp (case 2) or Tm≥Tr1+Tp (case 1) (step S30). Case 2 corresponds to a case where the distance between the object to be measured 160 and the distance measuring apparatus 1 is short, and where the respective pulses of the received measurement light mr and the first reference light r1 temporally overlap each other. A waveform for such a case is shown in FIG. 5B. Case 1 corresponds to a case where the distance between the object to be measured 160 and the distance measuring apparatus 1 is long, and where the respective pulses of the received measurement light mr and the first reference light r1 do not temporally overlap each other. A waveform for such a case is shown in FIG. 4B.

In the case where the result of the comparison in step S30 falls within case 1, Tt is calculated by the following formula (2) (step S40):

$$Tt = Tm - Tr1 \quad (2)$$

Then, the distance L to the object to be measured 160 is calculated from Tt obtained as described above by the following formula (step S60):

$$L = cTt/2 \quad (3)$$

In the formula, c is the speed of light.

In case 2, measurement cannot be performed with reference to the first reference light r1. In such a case, the process in step S50 of FIG. 6 is executed. That is, a time lag (difference) Td' between Tr2 and Tm and Td stored in the memory are used to perform the following computations (steps S51 and S52):

$$Td = Tr2 - Tr1 \quad (4)$$

$$Td' = Tr2 - Tm \quad (5)$$

$$Tt = Td - Td' \quad (6)$$

Next, as in case 1, the distance L to the object to be measured 160 is calculated using the formula (3) (step S60).

In the above process, measurement is performed with reference to the second reference light r2, which is different in passage time from the first reference light r1, and thus the overlapping pulses of the received measurement light mr and the first reference light r1 can be separated from each other.

As discussed earlier, Tr2 involves variations in delay time of the optical delay generating section 50, which involve variations in passage time due to temperature variations or the like in the case where the optical delay generating section 50 is formed by an optical fiber. That is, variation of Tr2 to Tr2+ΔTr2 results in the following formulas:

$$Td=Tr2+\Delta Tr2-Tr1 \qquad (4')$$

$$Td'=Tr2+\Delta Tr2-Tm \qquad (5')$$

However, such variation also results in the following formula:

$$Tt=Td-Td'=Tm-Tr1 \qquad (6')$$

Thus, the influence of ΔTr2 (in general, Tr2) is canceled for Tt. Meanwhile, Tr1 is affected by variations, but is not significantly affected by temperature variations because the delay time for Tr1 is set to be short as discussed earlier. Thus, measurement can be performed with high accuracy without being significantly affected by the temperature or the like.

Measurement for one object is terminated through the above procedures. In order to repeat the measurement ("YES" in step S70), it is further determined whether or not a change has been made to the measurement environment for the next measurement (step S80). The term "change to the measurement environment" refers to a change to the temperature, the installation position of the distance measuring apparatus, or the like that causes variations in calibration data measured in step S10. In the case where such variations do not occur ("NO" in step S80), the process returns to step S20 to repeat the measurement. In the case where variations in measurement environment occur ("YES" in step S80), the process returns to step S10, where Td serving as the calibration data is measured again to overwrite the stored measured value. With such a configuration, it is not necessary to perform step S10 in all measurements. Thus, measurement can be performed quickly. In order to terminate the measurement ("NO" in step S70), the flow of FIG. 6 is terminated.

Needless to say, step S80 can be omitted in the case where the calibration data acquisition process is performed in all or none of the measurements. The determinations in steps S70 and S80 may be performed automatically in accordance with predefined procedures, or may be performed manually in each measurement.

If there is a large difference among the levels of the received measurement light mr, the first reference light r1, and the second reference light r2, the measurement error is increased. Therefore, it is desirable to match the levels of the three lights described above with each other. In order to match the levels of the first reference light r1 and the second reference light r2 with each other, appropriate level adjusting means may be provided in the first reference light path R1 or the second reference light path R2 because the propagation paths for the first reference light r1 and the second reference light r2 are provided in the distance measuring apparatus, and it is not necessary to perform adjustment in accordance with the measurement environment. Meanwhile, the level of the received measurement light mr varies in accordance with the measurement distance L and the measurement environment such as the reflection condition of the object to be measured 160.

Figure 2:
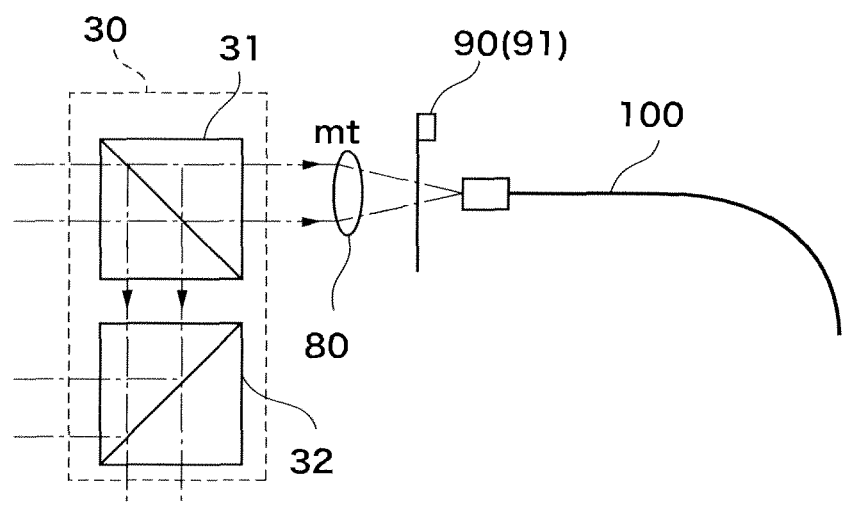
FIG. 2 shows a configuration in which a measurement light amount adjusting section is provided on the transmission side.

In the embodiment, as shown in FIG. 1, in order to absorb such variations, the measurement light amount adjusting section 92 is provided on the reception side. The measurement light amount adjusting section 91 may be provided on the transmission side as shown in FIG. 2, or measurement light amount adjusting sections may be provided on both the transmission side and the reception side. However, it is the best to provide a measurement light amount adjusting section on the reception side. As the measurement light amount adjusting section 90 (91, 92), a mechanism that mechanically adjusts an ND filter or an element that uses an electro-optical effect such as a liquid crystal transmission plate may be used, for example. Because it is necessary to completely block transmission through the measurement light path M as in step S11 of FIG. 6, the measurement light amount adjusting section 90 is required to completely block transmission of light in the present embodiment. The measurement light amount adjusting section 90 is controlled by the measurement control section 150 on the basis of detection results of level detection means (not shown). Rather than such automatic control, the measurement light amount adjusting section 90 may also be controlled manually.

Figure 9:
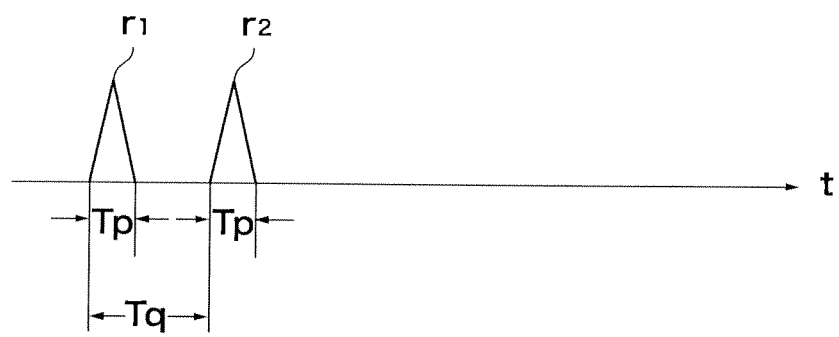
FIG. 9 shows the relationship between first reference light and second reference light.

With reference to FIG. 9, a required delay amount Tq set by the optical delay generating section 50 will be described. As illustrated in FIGS. 4 and 5, Td is the difference between the time over which the first reference light r1 passes through its light path and the time over which the second reference light r2 passes through its light path, and is generally close to the delay time value Tq set by the optical delay generating section 50, but more or less fluctuates under the influence of the delay time caused by other portions of the distance measuring apparatus. In order that the first reference light r1 and the second reference light r2 do not temporally overlap each other and in order to determine Td accurately even with such fluctuations, it is desirable to set Tq to twice or more the pulse width Tp of a pulse of the transmitted measurement light (Tp>nTs in the case where one piece of the transmitted measurement light is burst light formed by n single pulses with a pulse width of Ts).

Tr1, Tr2, and Tm can be measured using a technique of measuring a time lag ΔT between two pulses known in the art. For example, in order to measure the time lag between a start signal M1 (pulse signal) and a stop signal M2 (pulse signal), a reference frequency generator is caused to generate two reference signals S1 and S2 with a phase difference of π/2, a phase difference Δθ is detected on the basis of corresponding amplitude values A11, A12 and A21, A22 of the reference frequency generator of the reference signals S1 and S2 at timings at which the start signal M1 and the stop signal M2 are generated, and ΔT is calculated on the basis of the detected phase difference Δθ and the cycle of the reference signals S1 and S2 (JP-A-2006-133214, for example; referred to as "pulse time lag scheme"). Such a method is well known in the art, and thus is not described in more detail.

[Method Using Damped Oscillation Waves]

The received measurement light mr propagates in the air, and thus the peak value of the received measurement light mr may vary because of fluctuations in the air or the like. In such a case, if the pulse time lag scheme described above is used, a measurement error may be caused under the influence of variations in peak value. If a signal obtained through electric conversion of the received measurement light mr is caused to pass through a resonance circuit, a damped waveform with a time constant τ determined by the constant of the resonance circuit is obtained, and it is known that a zero cross point of the damped waveform does not vary unless the position of the center of gravity of the received measurement light mr varies (JP-A-2003-185747, for example). Thus, accurate measurement can be performed by detecting the position of the zero cross point. Such a distance measuring method will hereinafter be referred to as "damped oscillation wave zero cross point method".

Figure 7:
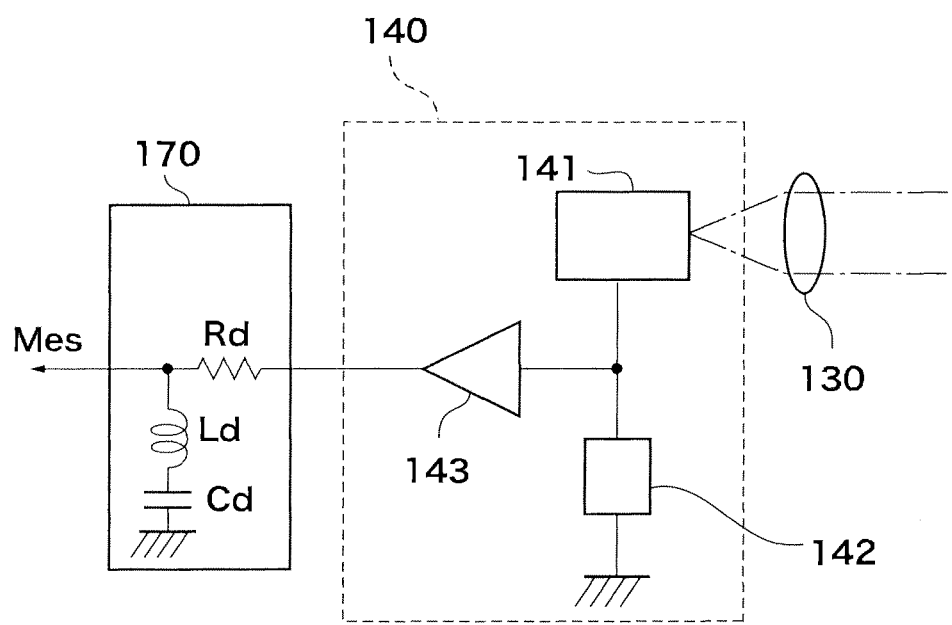
FIG. 7 shows an exemplary resonance circuit for generating a dammed oscillation waveform.

FIG. 7 shows a configuration for a case where the damped oscillation wave zero cross point method is applied. As shown in the drawing, a resonance circuit 170 is connected to an output end of the photo-electric converting section 140. The resonance circuit 170 is typically a series or parallel circuit with a resistance Rd, an inductance Ld, and a capacitance Cd. Rd includes an output resistance of the preamplifier 143.

Figure 8:
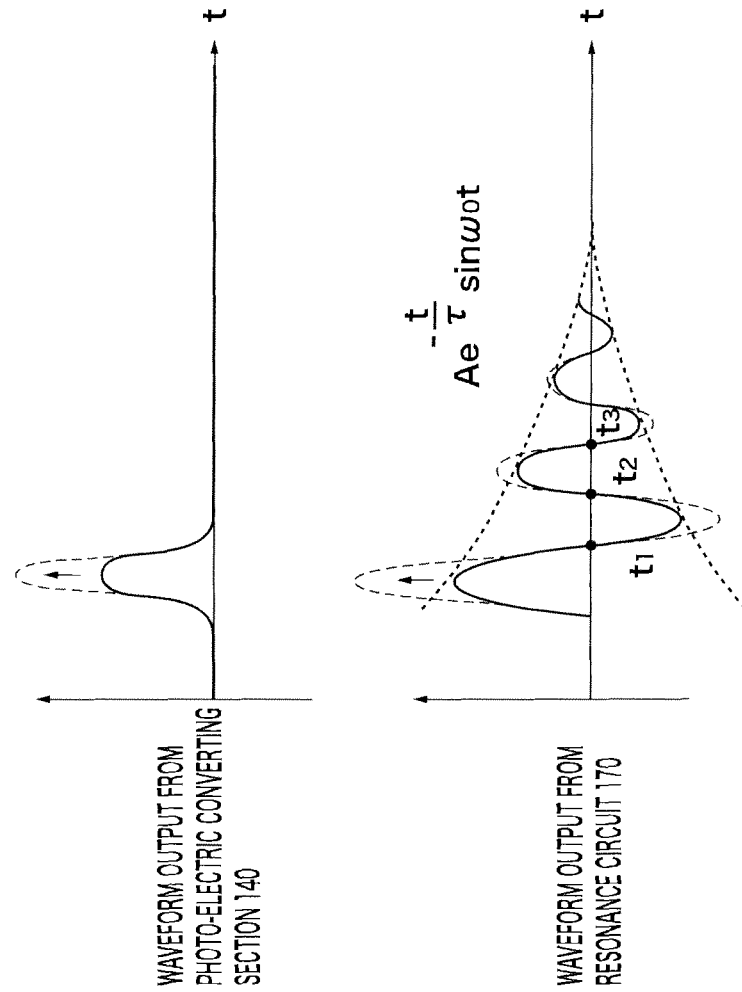
FIGS. 8A and 8B show input and output waveforms for generating damped oscillation waves.

FIGS. 8A and 8B show waveforms output from the photoelectric converting section 140 and the resonance circuit 170. In response to a single pulse shown in FIG. 8A, a damped oscillation waveform as shown in FIG. 8B is obtained. The frequency of damped oscillation is defined as $\omega_0 = 1/(Ld \cdot Cd)^{1/2}$, and the damping time constant $\tau$ is defined as $\tau = Rd \cdot Cd$ in case of a series resonance circuit. The broken line indicates a case where the peak value is varied (increased). As shown in the drawing, zero cross points t1 to Tn are not varied even if the peak value is varied. Thus, measurement can be performed with high accuracy by measuring the time lag between the reference timing and the zero cross point t1 at which the waveform is most stable.

A configuration that measures the time lag between a detected zero cross point and a reference timing is known in the art, and thus is not described in more detail (JP-A-Hei 05-232229, for example).

[Setting of Required Delay Amount in Case of Damped Oscillation Wave Zero Cross Point Method]

Figure 10:
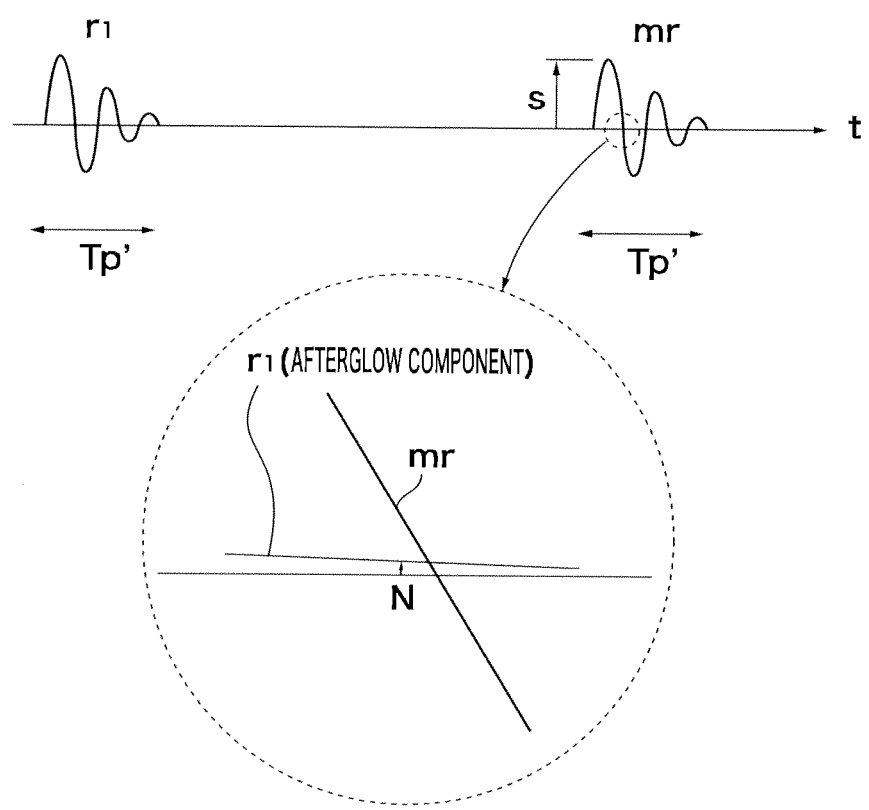
FIG. 10 shows interference caused in a damped oscillation wave zero cross point method.

FIG. 10 shows a case where two damped oscillation waves are temporally close to each other. This is, for example, a case where the time lag between the first reference light r1 and the received measurement light mr is to be calculated. While measurement can be performed with high accuracy by detecting a zero cross point of a ramped oscillation waveform as discussed above, the presence of an interference wave in the vicinity of the zero cross point may cause an error in measurement of the timing of the zero cross point. Thus, in the case where an afterglow of the damped waveform of the first reference light r1 remains in the vicinity of a zero cross point of the received measurement light mr as shown in FIG. 10, it is necessary to provide a sufficient temporal interval between the received measurement light mr and the first reference light r1 so that the afterglow component of the first reference light r1 is sufficiently dadmped. As shown in FIG. 10, a first cycle of the received measurement light mr is approximated by a sinusoidal wave with an amplitude level S (voltage indication) and a frequency fs. The frequency fs is the resonance frequency of the resonance circuit 170. Likewise, the afterglow component of the first reference light r1 serving as an interference wave is approximated by a sinusoidal wave with an amplitude level N (voltage indication) and a frequency fs. Then, the relationship between an error $\Delta Ls$ in measurement distance due to the interference wave and (N/S) is as follows:

$$\Delta Ls \approx \{(N/S)/2\pi\} \cdot \{(c/fs)/2\} \quad (7)$$

If the frequency fs is 30 MHz and the measurement error $|\Delta Ls|$ is 1 mm, a relation $N/S < 1/800$ (−58 dB) is required in this case. If this relation is applied to a damped signal waveform in which the amplitude is damped to one third each cycle, an optical distance of 30 m is required for the amplitude to damped to 1/800. For a margin, an optical distance of 50 m will suffice. Accordingly, in the case where the first reference light r1 is used, it is preferable to set the object to be measured 160 in the range of 50 m or more.

While the results of a case where the first reference light r1 is used have been described above, similar interference is produced also in the case where the second reference light r2 is used. Since the distance measurement range is set to 50 m or more in the case where the first reference light r1 is used, the measurement light is temporally closest to the second reference light r2 in the case where the object to be measured 160 is located at a distance of 50 m. Thus, in order that the influence of the interference wave can be ignored (N/S<1/800) in the case where measurement is performed using the second reference light r2 (case 1 of FIG. 4), an optical distance of 100 m with additional 50 m is required in this example. Because the optical distance of 100 m is a measurement distance over which light makes a round trip, light actually travels 200 m. Specifically, in the case where the optical delay generating section 50 is implemented using an optical fiber, the physical length of the optical fiber is 130 m in consideration of the refractive index (1.5) of the optical fiber. Thus, use of the damped oscillation wave zero cross point detection method increases the accuracy, but requires a large delay generating section, the delay time of which is subjected to large variations due to the temperature or the like. Even in such a case, it is possible to cancel variations in passage time and thus to maintain high-precision measurement through application of the embodiment of the present invention.

In the damped oscillation wave zero cross point method, as shown in FIG. 10, a pulse width Tp' of a light pulse signal converted into an electric signal is wider than the pulse width Tp of the transmitted measurement light mt. Thus, for the width of a received light pulse in the description made so far regarding the pulse width Tp, Tp for a single pulse is replaced with the duration Tp' of damped oscillation. Tp' is determined in accordance with the damping constant $\tau$ and the pulse width Tp of the transmitted measurement light mt.

The above description corresponds to a case where the transmitted measurement light mt is a single pulse. Besides a single pulse, there are provided embodiments shown in FIGS. 11 to 14.

Figure 11A:
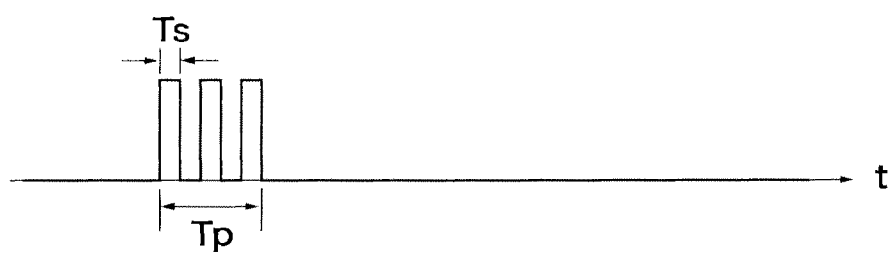
FIGS. 11A and 11B illustrate light pulses in the form of a burst.

In FIG. 11A, the light pulse (pulse width: Tp) includes pulses in the form of a burst in which a plurality of single pulses (pulse width: Ts) appear successively.

Figure 11B:
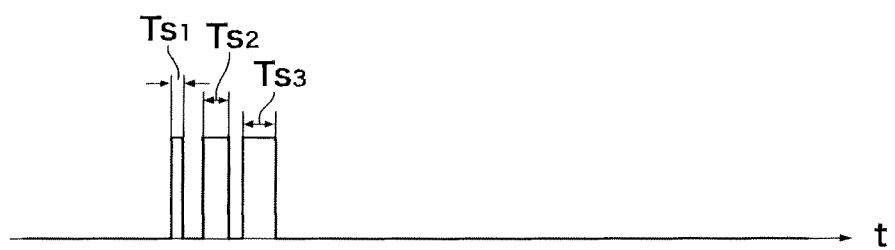

In FIG. 11B, which is similar to the case of pulses in the form of a burst shown in FIG. 11A, the single pulses have different pulse widths Ts1, Ts2, and Tsn.

Figure 12:
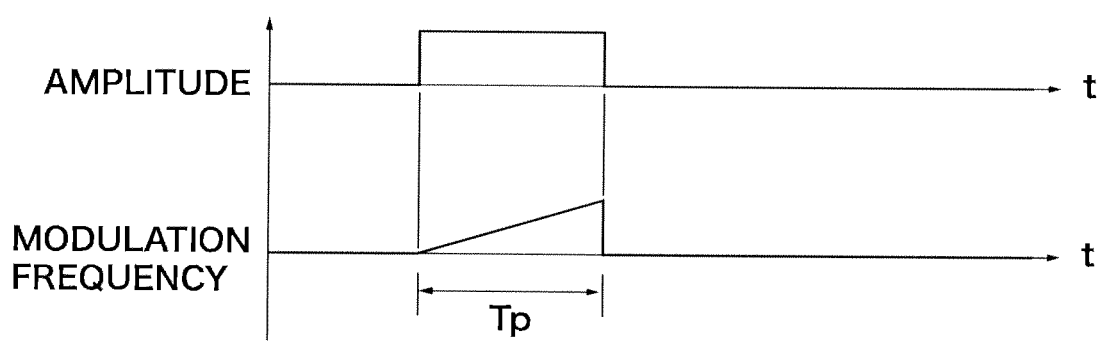
FIG. 12 illustrates a light pulse signal modulated with a chirp signal.

In FIG. 12, the light pulse has been modulated with a chirp signal. The chirp signal is a signal in which the frequency varies temporally continuously.

Figure 13:
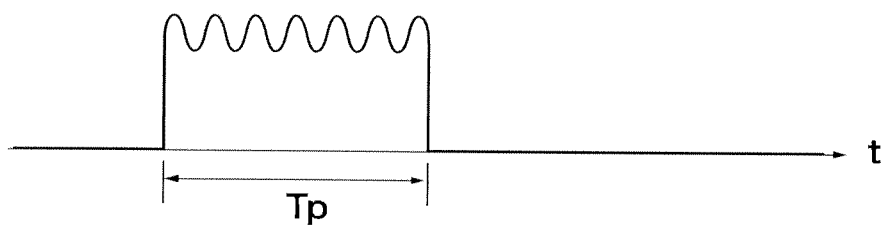
FIG. 13 illustrates an amplitude-modulated light pulse.

In FIG. 13, the light pulse has been amplitude-modulated.

Figure 14:
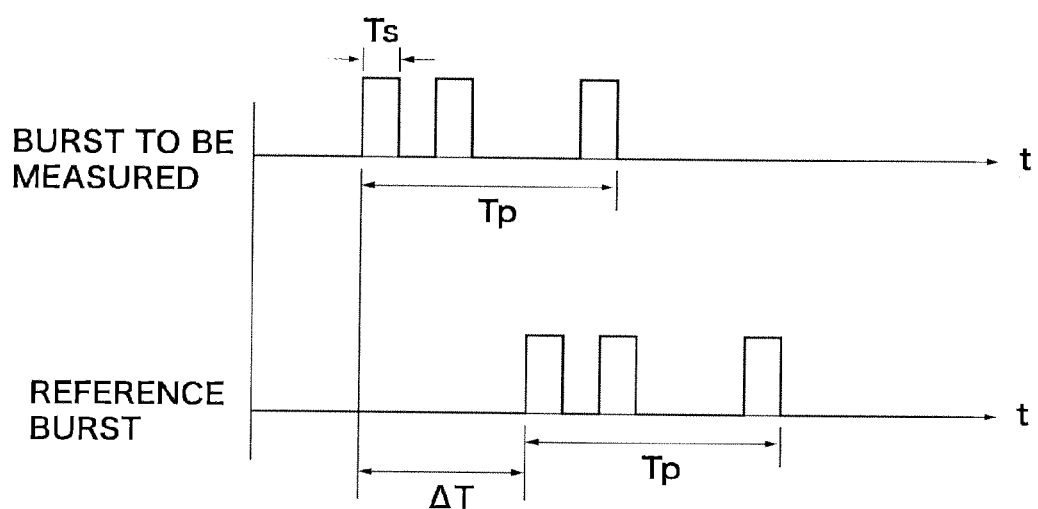
FIG. 14 illustrates detection of correlation of a particular pattern.
Figure 15A:
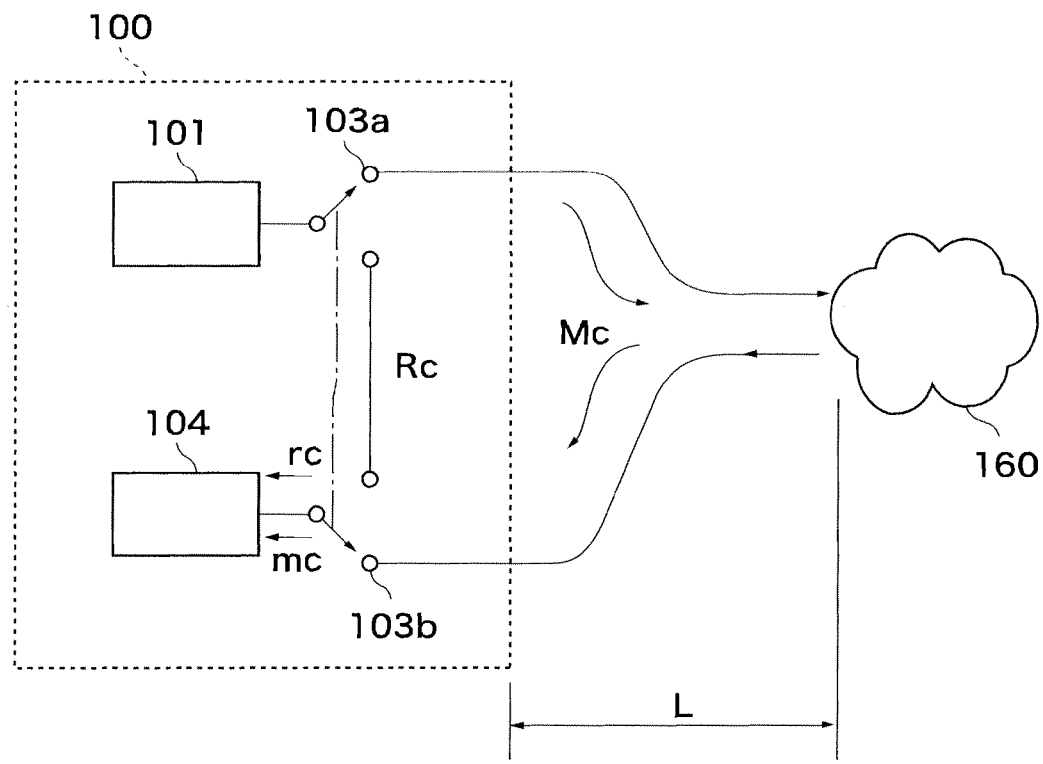
FIGS. 15A and 15B illustrate the principle of measurement according to the related art.
Figure 15B:
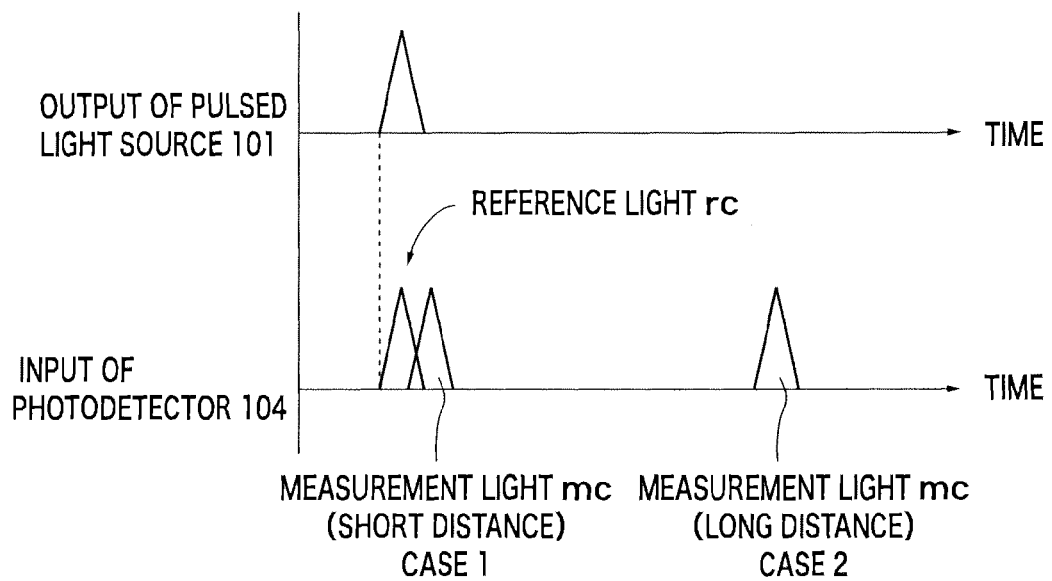

In FIG. 14, each light pulse is formed by a certain pattern of codes. Alternatively, each light pulse has been modulated by a certain pattern of codes. Correlation of such a pulse (burst to be measured) with a reference burst having the same pattern is detected to measure the time lag $\Delta T$ from the reference burst.

Through the embodiments described above, the times at which the received measurement light mr, the reference light r1, and the reference light r2 are detected can be measured accurately.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS AND SYMBOLS

1: distance measuring apparatus
10: light source section
11: light emission drive circuit
12: light emitting element
20: collimating lens
30: light splitting section
31: beam splitter
32: beam splitter
50: optical delay generating section
60: reference light path switching section
61: first reference light path switcher
62: second reference light path switcher
70: light synthesizing section
71: beam splitter
72: beam splitter
80: condenser lens
81: collimating lens
90: measurement light amount adjusting section
91: measurement light amount adjusting section (transmission side)
92: measurement light amount adjusting section (reception side)
93: reference light amount adjusting section
100: optical fiber
104: photodetector
110r: receiving section
110t: transmitting section
111: collimating lens
112: light projecting mirror
113: objective lens
113a: hole (objective lens)
120: optical fiber
130: condenser lens
140: photo-electric converting section
141: light receiving element
143: preamplifier
150: measurement control section
160: object to be measured
170: resonance circuit
180: lens
190: lens
200: lens
210: prism
Cont: control signal
M: measurement light path
Mes: measurement output
mr: received measurement light
mt: transmitted measurement light
r1: first reference light
R1: first reference light path
r2: second reference light
R2: second reference light path
Trg: trigger signal

The invention claimed is:

1. A distance measuring apparatus comprising:
a light source section that emits light in a pulsed manner in synchronization with a trigger signal;
a light splitting section that branches the light from the light source section into first reference light, second reference light, and transmitted measurement light;
a first reference light path that transmits the first reference light and that causes no variations in optical distance;
a second reference light path that includes an optical delay generating section which generates a temporal delay with respect to the first reference light path and that transmits the second reference light;
a reference light path switching section that has a function of allowing transmission through either one of the first reference light path or the second reference light path and blocking transmission through the other one of the first reference light path or the second reference light path, allowing transmission through both the first and second reference light paths, and blocking transmission through both the first and second reference light paths;
a transmitting section that radiates the transmitted measurement light to an object to be measured;
a receiving section that receives the radiated light reflected by the object to be measured as received measurement light;
a measurement light amount adjusting section that blocks the transmitted measurement light or the received measurement light;
a light synthesizing section that synthesizes output light from the first reference light path, output light from the second reference light path, and the received measurement light received by the receiving section;
a photo-electric converting section that converts a light signal synthesized by the light synthesizing section into an electric signal; and
a measurement control section having a function of controlling the reference light path switching section and the measurement light amount adjusting section to determine a distance on the basis of a time at which a signal obtained through the photo-electric converting section is detected.

2. The distance measuring apparatus according to claim 1, wherein the measurement control section has:
(1) a function of controlling the reference light path switching section so as to allow transmission through the first reference light path and the second reference light path, controlling the measurement light amount adjusting section so as to block one of the transmitted measurement light or the received measurement light, and measuring a time lag (Tr1) between the trigger signal and the first reference light and a time lag (Tr2) between the trigger signal and the second reference light using an output of the photo-electric converting section to store the measurement results;

(2) a function of blocking both transmissions through the first reference light path and the second reference light path and allowing both transmissions of the transmitted measurement light and the received measurement light to measure a time lag (Tm) between the received measurement light and the trigger signal;

(3) a first measurement function of allowing transmission through the first reference light path, blocking transmission through the second reference light path, and allowing both transmissions of the transmitted measurement light and the received measurement light, to determine a measurement light path difference (Tt) in accordance with a value of a time lag (Tm−Tr1) between the received measurement light and the first reference light;

(4) a second measurement function of blocking transmission through the first reference light path, allowing transmission through the second reference light path, and allowing both transmissions of the transmitted measurement light and the received measurement light, to calculate a time lag ((Td'=Tr2−Tm) between the second reference light and the received measurement light, and further calculating a time lag (Td=Tr2−Tr1) from values of the time lag (Tr2) and the time lag (Tr1) calculated in the function (1) to determine the measurement light path difference (Tt) by calculating (Td−Td');

(5) a function of selectively using the first measurement function and the second measurement function on the basis of the time lag (Tm) obtained by the function (2); and (6) a function of determining a distance to the object to be measured, in accordance with a value of the measurement light path difference (Tt).

3. The distance measuring apparatus according to claim 2, wherein the measurement light amount adjusting section further has a function of attenuating the received measurement light or the transmitted measurement light, and a function of roughly matching a level of the received measurement light with levels of the first reference light r1 and the second reference light r2.

4. The distance measuring apparatus according to claims 3, wherein the measurement control section compares the time lag between the first reference light and the received measurement light with the pulse width of the pulsed light to determine whether the first reference light and the received measurement light are separate from each other, and the measurement control section activates the first measurement function if it is determined that the first reference light and the received measurement light are separate from each other, and activates the second measurement function if it is determined that the first reference light and the received measurement light are not separate from each other.

5. The distance measuring apparatus according to claim 3, wherein the optical delay generating section is an optical fiber.

6. The distance measuring apparatus according to claim 3, wherein the photo-electric converting section has a resonance circuit section that converts the received pulsed light signal into a damped oscillation waveform, and determines the time lag on the basis of a zero cross point of the damped oscillation waveform.

7. The distance measuring apparatus according to claim 2, wherein a time of the delay generated by the optical delay generating section is set such that a difference between a time of passage through the first reference light path and a time of passage through the second reference light path is twice or more a pulse width of the pulsed light produced by the light source section.

8. The distance measuring apparatus according to claim 7, wherein the optical delay generating section is an optical fiber.

9. The distance measuring apparatus according to claim 2, wherein the measurement control section compares the time lag between the first reference light and the received measurement light with the pulse width of the pulsed light to determine whether the first reference light and the received measurement light are separate from each other, and the measurement control section activates the first measurement function if it is determined that the first reference light and the received measurement light are separate from each other, and activates the second measurement function if it is determined that the first reference light and the received measurement light are not separate from each other.

10. The distance measuring apparatus according to claim 9, wherein the optical delay generating section is an optical fiber.

11. The distance measuring apparatus according to claim 9, wherein the photo-electric converting section has a resonance circuit section that converts the received pulsed light signal into a damped oscillation waveform, and determines the time lag on the basis of a zero cross point of the damped oscillation waveform.

12. The distance measuring apparatus according to claim 2, wherein the optical delay generating section is an optical fiber.

13. The distance measuring apparatus according to claim 2, wherein the photo-electric converting section has a resonance circuit section that converts the received pulsed light signal into a damped oscillation waveform, and determines the time lag on the basis of a zero cross point of the damped oscillation waveform.

14. The distance measuring apparatus according to claim 1, wherein a time of the delay generated by the optical delay generating section is set such that a difference between a time of passage through the first reference light path and a time of passage through the second reference light path is twice or more a pulse width of the pulsed light produced by the light source section.

15. The distance measuring apparatus according to claim 14, wherein the measurement control section compares the time lag between the first reference light and the received measurement light with the pulse width of the pulsed light to determine whether the first reference light and the received measurement light are separate from each other, and the measurement control section activates the first measurement function if it is determined that the first reference light and the received measurement light are separate from each other, and activates the second measurement function if it is determined that the first reference light and the received measurement light are not separate from each other.

16. The distance measuring apparatus according to claim 14,
wherein the optical delay generating section is an optical fiber.

17. The distance measuring apparatus according to claim 14,
wherein the photo-electric converting section has a resonance circuit section that converts the received pulsed light signal into a damped oscillation waveform, and determines the time lag on the basis of a zero cross point of the damped oscillation waveform.

18. The distance measuring apparatus according to claim 1,
wherein the optical delay generating section is an optical fiber.

19. The distance measuring apparatus according to claim 18,
wherein the photo-electric converting section has a resonance circuit section that converts the received pulsed light signal into a damped oscillation waveform, and determines the time lag on the basis of a zero cross point of the damped oscillation waveform.

20. A distance measuring method for measuring a distance using a distance measuring apparatus;
the distance measuring apparatus having,
a light source section that emits light in a pulsed manner in synchronization with a trigger signal,
a light splitting section that branches the light from the light source section into first reference light, second reference light, and transmitted measurement light,
a first reference light path that transmits the first reference light and that causes no variations in optical distance,
a second reference light path that includes an optical delay generating section which generates a temporal delay with respect to the first reference light path and that transmits the second reference light,
a reference light path switching section that has a function of allowing transmission through either one of the first reference light path or the second reference light path and blocking transmission through the other one of the first reference light path or the second reference light path, allowing transmission through both the first and second reference light paths, and blocking transmission through both the first and second reference light paths,
a transmitting section that radiates the transmitted measurement light to an object to be measured,
a receiving section that receives the radiated light reflected by the object to be measured as received measurement light,
a measurement light amount adjusting section that blocks the transmitted measurement light or the received measurement light,
a light synthesizing section that synthesizes output light from the first reference light path, output light from the second reference light path, and the received measurement light received by the receiving section, and
a photo-electric converting section that converts a light signal synthesized by the light synthesizing section into an electric signal;
the distance measuring method comprising:
(1) a step of controlling the reference light path switching section so as to allow transmission through the first reference light path and the second reference light path, controlling the measurement light amount adjusting section so as to block one of the transmitted measurement light or the received measurement light, and measuring a time lag (Tr1) between the trigger signal and the first reference light and a time lag (Tr2) between the trigger signal and the second reference light using an output of the photo-electric converting section to store the measurement results;
(2) a step of blocking both transmissions through the first reference light path and the second reference light path and allowing both transmissions of the transmitted measurement light and the received measurement light to measure a time lag (Tm) between the received measurement light and the trigger signal;
(3) a first measurement step of allowing transmission through the first reference light path, blocking transmission through the second reference light path, and allowing both transmissions of the transmitted measurement light and the received measurement light, to determine a measurement light path difference (Tt) in accordance with a value of a time lag (Tm−Tr1) between the received measurement light and the first reference light;
(4) a second measurement step of blocking transmission through the first reference light path, allowing transmission through the second reference light path, and allowing both transmissions of the transmitted measurement light and the received measurement light, to calculate a time lag (Td'=Tr2−Tm) between the second reference light and the received measurement light, and further calculating a time lag (Td=Tr2−Tr1) from values of the time lag (Tr2) and the time lag (Tr1) calculated in the step (1) to determine the measurement light path difference (Tt) by calculating (Td−Td');
(5) a step of selectively using the first measurement step and the second measurement step on the basis of the time lag (Tm) obtained by the step (2); and
(6) a step of determining a distance to the object to be measured, in accordance with a value of the measurement light path difference (Tt).

* * * * *